United States Patent

[11] 3,558,147

| [72] | Inventor | Ture Johansson<br>Goteborg, Sweden |
|---|---|---|
| [21] | Appl. No. | 776,900 |
| [22] | Filed | Nov. 19, 1968 |
| [45] | Patented | Jan. 26, 1971 |
| [73] | Assignee | Eriksbergs Mek Verkstads Aktiebolag<br>Hisingen, Goteborg, Sweden |
| [32] | Priority | Nov. 29, 1967 |
| [33] | | Sweden |
| [31] | | 16,341/67 |

[54] CONE HEAD
4 Claims, 1 Drawing Fig.

[52] U.S. Cl. .................................................. 279/103, 287/119; 279/104

[51] Int. Cl. .................................................. B23b 31/06, B23b 31/44

[50] Field of Search .......................................... 279/23, 28, 24, 29, 89, 102, 103, 104; 287/119

[56] References Cited
UNITED STATES PATENTS

| 420,270 | 1/1890 | Horn ............................ | 279/19X |
| 1,307,937 | 6/1919 | Straub ......................... | 279/29 |
| 1,817,775 | 8/1931 | Sipe ............................. | 287/119X |

*Primary Examiner*—Robert C. Riordon
*Assistant Examiner*—Donald D. Evenson
*Attorney*—Holman & Stern ABSTRACT: Cone heads for the shaft ends of machine tools are retained by friction within a correspondingly shaped mounting at the end of a driving part. If the tool during use will be subjected to pulling stresses, the friction may be insufficient to retain the tool. In order to obtain a satisfactory locking, the present design proposes the use of a spring washer mounted at the top of the cone head and adapted to engage the internal wall of the mounting when the cone head is introduced therein. A tubular member carried by means at the top of the cone head is designed to exert pressure on the washer to deform the same when it is desired to withdraw the cone head.

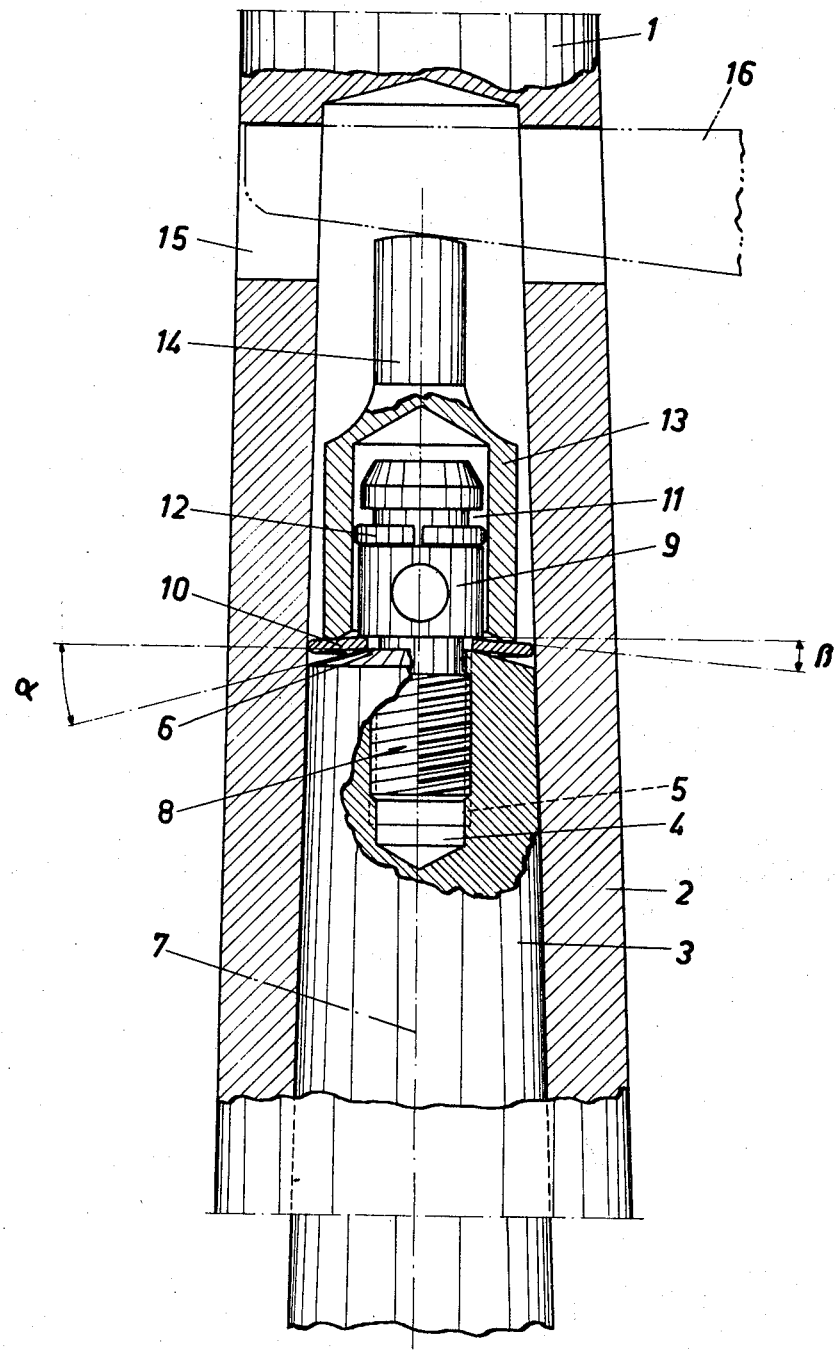

CONE HEAD

BACKGROUND OF THE INVENTION

The present invention relates to a cone head of the type which is adapted by way of its external conical surface to cooperate with a correspondingly shaped conical inner surface in a mounting piece.

Such cone heads, sometimes called tool-cones, are used in working machines to retain by friction a tool in relation to a driving part. Especially in connection with "back-facing" tools the cone will be subjected to pulling stresses, and in such cases the friction grip between the two parts will not be sufficient. It has been proposed to lock the cone in relation to the driving part by means of a wedge, which is introduced into a radial groove in the conical mounting part. This design is satisfactory, but rather complicated and thus expensive to manufacture.

SUMMARY OF THE INVENTION

The object of the present invention is to provide a simple and cheap design for locking a conical cone head in relation to its mounting. One advantage of the new design is that it will be possible to disengage the cone head in the same simple manner as previously, i.e., by introducing a wedge into a radial opening in the mounting on top of the cone. The invention is essentially characterized by fitting means at the top end of the cone head, concentrically with the same and adapted to support at least one spring washer, the circumference of which essentially corresponds to, or is somewhat bigger than the circumference of said top end, which is designed with a beveled outer portion forming an angle to a plane perpendicular to the longitudinal axis of the cone head which is bigger than the angle formed by an unstressed washer and said plane, and by a tubular member surrounding the fitting means and resting on the (topmost) washer to exert pressure thereon when subjected to pressure at its opposite end.

BRIEF DESCRIPTION OF THE DRAWING

One embodiment of the invention is shown by way of example on the attached drawing, which shows the cone head and the mounting therefor partly in section.

DESCRIPTION OF THE PREFERRED EMBODIMENT

On the drawing, 1 denotes a driving shaft of a working machine, the end portion of which is designed as a conical mounting 2. This is adapted to receive a shaft end 3 of a tool, which here is designed as a morse cone, the conical envelop surface face of which matches the internal conical surface of the mounting. At the top portion of the cone head 3 an axial bore 4 provided with internal threads 5 is arranged concentric with the longitudinal axis of the cone. The top end of the cone has a beveled portion 6 with this beveled surface forming an angle $\alpha$ with a plane perpendicular to longitudinal axis 7 of the cone. A bolt 8 having a head 9 is threaded into bore 4, and is designed in such a manner that the head will retain a spring washer 10 in relation to the cone head. The washer is in unstressed condition slightly dished with the convex side turned away from the beveled portion 6 of the cone head. The spring washer 10 will in unstressed condition form an angle $\beta$ with above mentioned plane, with this angle being somewhat less than the angle at portion 6.

The bolt head 9 is provided with a circumferential groove 11 into which an open spring ring 12 is introduced. This ring is somewhat bigger than the passage in the bore of a tubular member 13. The latter is designed to enclose the bolt head and resiliently retain the same by means of the spring ring 12. The tubular member 13 is axially displaceable in relation to the bolt head, and may by its lower end be brought into contact with the spring washer 10. The tubular member 13 is at its end remote from the washer 10 provided with a tongue 14, which in a manner known per se in mounted condition will be located opposite to a radial opening 15 in the mounting 2. A wedge 16 may be introduced into this opening in order to exert a pressure on the tongue 14, and thus also on the washer 10.

The parts are made to cooperate in the following manner. When the cone head 3 is introduced into the mounting 2, the spring washer 10 which has essentially the same external dimension as or is slightly wider than the adjacent portion of the cone will be slightly deformed towards the beveled portion 6 in such a manner that the spring washer will exert a pressure on the internal walls of the mounting. If the cone head is subjected to a pulling stress this must be sufficient strong to turn the washer "inside out," or to deform the same considerably before the cone head can be withdrawn from the mounting. It will only be possible to withdraw the cone head from the mounting without incurring damages to the parts by exerting a pressure on the upper surface of the spring washer 14 remote from the end portion of the cone head. This is brought about by means of the wedge 16, which forces the tubular member 13 against the washer 10 in such a manner that this will be further deflected in the direction towards the beveled portion 6. Thus, the contact between the edge of the spring washer and the internal passage in the mounting 2 is reduced or overruled sufficiently to make a withdrawal of the cone head 3 possible.

The relationship between the angle the washer 10 and the beveled portion 6, as measured with respect of the plane perpendicular to the longitudinal axis 7 of the cone head, is 1:3. An angle at the washer of from 3° to 9° preferably 5° and an angle at the beveled surface of from 9° to 27° preferably 15°- have proven advantageous.

I claim:

1. In a cone head adapted to cooperate with a correspondingly shaped passage in a driving mounting:
    fitting means at the top end of the cone head mounted concentrically with the same;
    at least one dished spring washer the circumference of which essentially corresponds to that of the top of the cone head retained by the fitting means with its convex surface remote from the cone head;
    a beveled border portion at the top end of the cone head;
    a tubular member surrounding the fitting means and adapted to be axially displaced within the mounting to exert pressure on the washer, when it is desired to withdraw the cone head from the mounting; and
    the angle between the beveled border portion and a plane perpendicular to the longitudinal axis of the shaft being bigger than the angle formed by the surface of the unstressed washer and said plane.

2. The cone head according to claim 1 in which the fitting means is designed as a bolt having a round head and threaded into an axial bore concentric with the cone head and adapted to resiliently retain the tubular member in such a manner that the latter will be axially displaceable in relation to the head of the bolt.

3. The cone head according to claim 2 in which the bolt head is provided with circumferential groove adapted to receive an open spring ring, the circumference of said spring ring being somewhat bigger than the passage in the bore of the tubular member.

4. The cone head according to claim 1 in which the relationship between the angle at the washer and the angle at the cone end is about 1:3, the angle at the washer is 3°—9°, preferably 5° and the angle at the cone end is 9°—27°, preferably 15°.